(12) United States Patent
Filipowicz et al.

(10) Patent No.: US 10,209,447 B2
(45) Date of Patent: Feb. 19, 2019

(54) MICRO SPLICE PROTECTOR

(71) Applicant: II-VI Incorporated, Saxonburg, PA (US)

(72) Inventors: Mark Filipowicz, Scotts Valley, CA (US); Toan Tran, San Jose, CA (US)

(73) Assignee: II-VI Incorporated, Saxonburg, PA (US)

(*) Notice: Subject to any disclaimer, the term of this patent is extended or adjusted under 35 U.S.C. 154(b) by 13 days.

(21) Appl. No.: 15/215,705

(22) Filed: Jul. 21, 2016

(65) Prior Publication Data

US 2017/0075067 A1   Mar. 16, 2017

Related U.S. Application Data

(60) Provisional application No. 62/217,689, filed on Sep. 11, 2015.

(51) Int. Cl.
*G02B 6/255* (2006.01)
*G02B 6/245* (2006.01)

(52) U.S. Cl.
CPC ............ *G02B 6/2558* (2013.01); *G02B 6/245* (2013.01); *G02B 6/2551* (2013.01)

(58) Field of Classification Search
CPC ...... G02B 6/2558; G02B 6/245; G02B 6/2551
USPC ........................................................ 385/96
See application file for complete search history.

(56) References Cited

U.S. PATENT DOCUMENTS

| | | |
|---|---|---|
| 4,773,728 A | 9/1988 | Kershaw |
| 4,964,689 A | 10/1990 | Wichansky |
| 5,018,818 A * | 5/1991 | Barlow .............. G02B 6/3846 385/55 |
| 5,222,171 A | 6/1993 | Straus |
| 5,416,873 A | 5/1995 | Huebscher et al. |
| 5,894,536 A * | 4/1999 | Rifkin ................. G02B 6/2558 385/96 |
| 6,142,677 A | 11/2000 | Sato et al. |
| 6,273,621 B1 | 8/2001 | Eslambolchi et al. |
| 6,350,065 B1 | 2/2002 | Arima |
| 6,367,990 B1 | 4/2002 | Dumitriu |
| 6,485,199 B1 | 11/2002 | Ware et al. |

(Continued)

FOREIGN PATENT DOCUMENTS

| | | |
|---|---|---|
| WO | WO2012010776 | 1/2012 |
| WO | WO2015066185 | 5/2015 |

*Primary Examiner* — Jerry Blevins
(74) *Attorney, Agent, or Firm* — Wendy W. Koba (57) ABSTRACT

A micro splice protector for a fusion connection between a pair of optical fibers takes the form of a cylindrical sleeve of dimensions similar to that of the fusion splice itself, with an epoxy material used to encase the fusion splice within the sleeve. The sleeve is formed to exhibit an inner diameter only slightly greater than the outer diameter of the optical fibers, with the length of the sleeve typically formed to be only slightly longer than the stripped end terminations of the pair of fibers being spliced together. The cylindrical sleeve is formed of a rigid, but lightweight, material (e.g., stainless steel, fused silica) and an epoxy material is injected into the configuration to fill any gaps between the fusion connection and the inner surface of the sleeve. The result is relatively stiff fusion splice protector that is extremely small in size and well-suited for use in optical component packages where space is at a minimum.

5 Claims, 8 Drawing Sheets

(56) References Cited

U.S. PATENT DOCUMENTS

| | | |
|---|---|---|
| 6,981,802 B2 | 1/2006 | Sasaki et al. |
| 7,055,235 B2 | 6/2006 | Liu |
| 7,494,289 B1 | 2/2009 | Chen |
| 7,607,840 B2 * | 10/2009 | Martin ................. G02B 6/2558 385/95 |
| 8,641,300 B2 | 2/2014 | Murashima et al. |
| 8,696,221 B2 * | 4/2014 | Vastmans ............. G02B 6/2558 385/99 |
| 8,915,659 B2 | 12/2014 | Marcouiller et al. |
| 9,063,286 B2 * | 6/2015 | Durrant ................ G02B 6/2558 |
| 9,500,808 B2 * | 11/2016 | Carralero ............ G02B 6/4277 |
| 2005/0191014 A1 | 9/2005 | Renfro, Jr. et al. |
| 2007/0047883 A1 | 3/2007 | Watte et al. |
| 2009/0034916 A1 | 2/2009 | LeBlanc |
| 2011/0135247 A1 | 6/2011 | Achara et al. |
| 2015/0110450 A1 | 4/2015 | Jones, III et al. |
| 2015/0160417 A1 | 6/2015 | Park et al. |

* cited by examiner

MICRO SPLICE PROTECTOR

CROSS-REFERENCE TO RELATED APPLICATIONS

This application claims the benefit of U.S. Provisional Application Ser. No. 62/217,689, filed Sep. 11, 2015 and herein incorporated by reference.

TECHNICAL FIELD

The present invention relates to the utilization of fusion splices in optical fiber connections and, more particularly, to a fusion splice protector in the form of a cylindrical sleeve of rigid material with epoxy used to affix the splice in place within the sleeve, where the diameter of the sleeve is only slight larger than the fibers themselves.

BACKGROUND OF THE INVENTION

In the continuing development of optical communication systems, components such as optical amplifiers need to fit into smaller and smaller enclosures (e.g., common form-factor pluggable packages such as CFP, CFP2, CFP4 transceivers and the like). There is limited space for optics and mechanics within these enclosures, thus requiring the included components to be reduced in size as much as possible.

An exemplary one of these CFP enclosures may be required to house a fiber-based optical amplifier that utilizes a spool of erbium-doped fiber as the gain medium. Besides the spool of gain fiber, a typical erbium-doped fiber amplifier (EDFA) includes various input and output fibers (for the input signal and pump signal), as well as other optical fiber-coupled components (e.g., an optical pump source, isolator, and the like). While the optical fibers themselves are small in diameter (e.g., 250 µm), they need to be spliced to one another to complete the optical signal path within the enclosure. In most cases, a fusion splicing process is used to connect a fiber of one component to a fiber of another component. In the fusion process, the end faces of the fibers are heated and "fused" together. Once created, the fusion splice needs to be protected in order to maintain its mechanical strength and environmental integrity. Splice protectors serve to shield the fusion splice from bending and experiencing stress, which may introduce signal loss and ultimately cause the splice to be compromised over time.

Conventional splice protectors are typically made of a flexible, heat-shrinkable plastic, with a small metal bar inside the plastic to create a region of rigidity in the vicinity of the splice. While these commercially available splice protectors have been useful in the past, they are too large in diameter and length to be readily accommodated into the current CFP package designs (and, accordingly, any future enclosures that may be even smaller).

Another option is to overcoat the splice with a polymer that is used to protect the splice. However, these polymer coatings do not necessarily provide adequate mechanical protection and high reliability, especially for small bend conditions as associated with the CFP enclosures.

These aforementioned solutions, especially commercial splice protectors, have been used in the telecommunications industry for many years, but are not adequate for evolving applications.

SUMMARY OF THE INVENTION

The needs remaining in the prior art are addressed by the present invention, which relates to fusion splices in optical fibers and, more particularly, to a fusion splice protector in the form of a cylindrical sleeve of dimensions only slightly larger than the fibers themselves.

In accordance with an exemplary embodiment of the present invention, a micro splice protector includes cylindrical sleeve formed of a rigid material (for example, stainless steel or fused silica) that is disposed to cover a fusion splice (as well as portions of the joined fibers beyond the location of the actual splice). An epoxy material is introduced into the sleeve so as to flow and fill any gaps between the spliced fibers and the interior surface of the sleeve. The cylindrical sleeve is preferably formed to exhibit an inner diameter only slighting larger than the optical fibers, thus forming an in-line micro-sized splice protector that has essentially the same profile as the fibers themselves.

In an exemplary embodiment of the present invention, additional applications of epoxy are used to coat the end terminations of the cylindrical sleeve in a manner that creates a smooth transition from the outer surface of the fibers to the sleeve (i.e., a "conformal" profile). These additional epoxy coatings also provide additional strain relief for the micro splice protector. The epoxy used for this additional strain relief feature may be the same as that used in affixing the fusion splice within the micro sleeve protector, or a different epoxy compound.

Various types of metals, ceramics, metal matrix composites (MMCs) and the like may be used to form the micro splice protector sleeve, where qualities such as being lightweight while exhibiting mechanical strength are important. Besides stainless steel, fused silica has been found to be an excellent material choice for this component. Additionally, it is preferred that the interior surface and end terminations of the sleeve be polished or as smooth as possible to minimize any damage to the optical fibers as the sleeve is positioned over a fiber prior to performing the splice, and then moving the sleeve along the fiber after the splice is made.

One particular embodiment of the present invention takes the form of a micro splice protector for encasing a fusion splice connection between a pair of optical fibers, where the splice protector includes a cylindrical sleeve of rigid material disposed over to encase a fusion splice, the cylindrical sleeve having an inner diameter slightly greater than the output diameter of the pair of optical fibers and a length sufficient to extend beyond stripped end terminations of the pair of optical fibers; and epoxy material disposed within the cylindrical sleeve so as to surround the stripped end terminations of the pair of optical fibers and the fusion splice, filling remaining space within the cylindrical sleeve.

Other and further embodiments and advantages of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

A new type of splice protector is proposed that is small in size, easy to use, and works well within the current dimensions of CFP-based enclosures. Inasmuch as the inventive splice protector is only a few millimeters larger in cross-section than the fibers themselves, it is contemplated that it will remain useful even as packaging dimensions continue to decrease.

Figure 1:
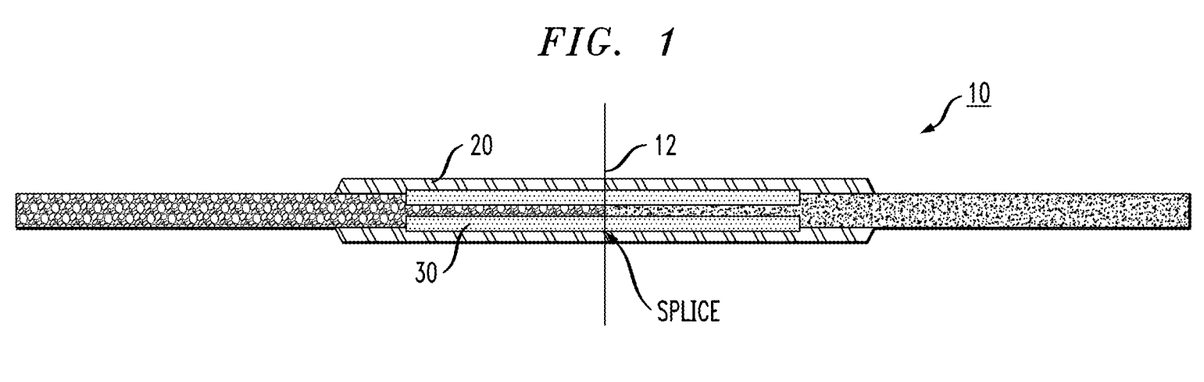
FIG. 1 is a cut-away side view of the inventive micro splice protector as positioned in place over a fusion splice.

FIG. 1 is a cut-away side view of an exemplary micro splice protector 10 in place over a fusion splice 12 formed to join a first optical fiber 14 to a second optical fiber 16. As is well-known in the art, a fusion splice is created between endfaces of a pair of optical fibers that have been stripped to remove outer jacket and coating layers, leaving only the silicon-based core and cladding regions of the fibers. An electric arc, or other type of high energy pulse, is applied to the abutting endfaces so as to essentially melt the silicon material in a manner that joins the two fibers together. While a fusion splice is adequate to provide optical coupling between the fibers, the need to strip off the outer layers (which provide mechanical strength to an optical fiber) leaves the fusion region vulnerable to damage. While various prior art configurations have been proposed to cover the fusion region with one or more layers of protective material, these solutions are too bulky for today's small form factor designs. Micro splice protector 10, as described in more detail below, comprises a sleeve 20 that is disposed to cover the location of fusion splice 12, with an epoxy material 30 injected to fill the space between spliced fibers 14, 16 and an interior surface 22 of sleeve 20. Once epoxy 30 cures, micro splice protector 10 is considered to be completely functional, preventing damage to fusion splice 12 while maintaining the low profile required for advanced packaging applications.

Figure 2:
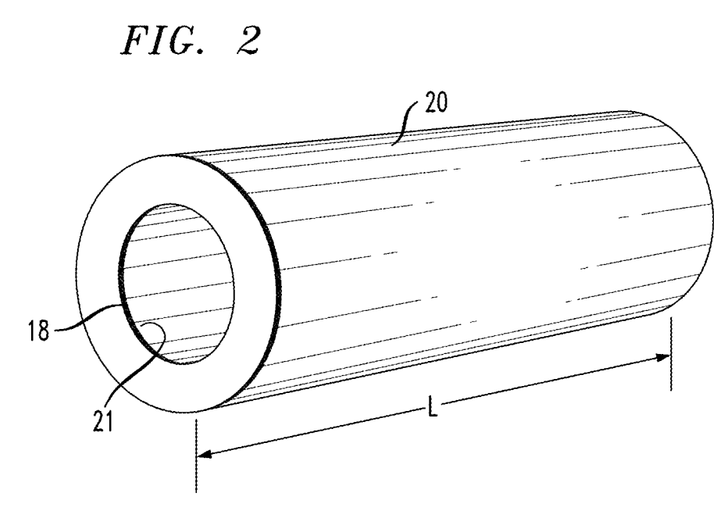
FIG. 2 is an isometric view of an exemplary cylindrical sleeve component of the inventive micro splice protector.
Figure 3:
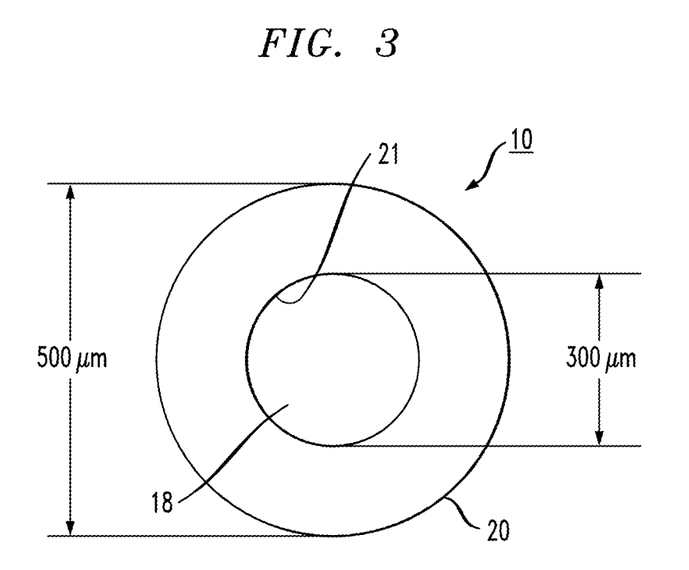
FIG. 3 is an end view of the cylindrical sleeve component of FIG. 2.

FIG. 2 is an isometric view of an exemplary cylindrical sleeve 20 as utilized in micro splice protector 10 of the present invention. Cylindrical sleeve 20 is preferably formed of a rigid, yet lightweight material, such as stainless steel. Stainless steel is only one possibility, and it is to be understood that various other rigid materials (such as certain metals, ceramics, metal matrix composites (MMCs) and the like) are contemplated as acceptable alternatives. Indeed, a fused silica ceramic material is particularly considered to be one of these alternatives. FIG. 3 is an end view of cylindrical sleeve 20, which clearly shows that it is cylindrical in form, including a longitudinal bore 18.

As mentioned above, a significant aspect of the present invention is that micro splice protector 10 is a "low profile" device, that is, having a diameter only slightly greater than the outer diameter of the fibers being fused together. For an exemplary embodiment of the present invention as shown in FIG. 3, sleeve 20 may be formed to exhibit an inner diameter of about 300 µm and an outer diameter of about 500 µm (when used to protect optical fibers having an outer diameter on the order of 250 µm). Other suitable dimensions are possible, depending on the sizes of the fibers being spliced together). For the sake of illustration and example, the dimensions and material of an exemplary micro splice protector 10 may be on the order of a hypodermic needle. The length "L" of micro splice protector 10 is selected to be sufficient to provide the necessary adhesion of the fiber to the splice protector (via epoxy), as well as mechanical protection (via the strength of the metal sleeve material). For some configurations, a length L of about 8 mm was found to be satisfactory.

In accordance with the present invention, therefore, it is proposed to utilize micro splice protector 10 to encase fusion splice 12 and prevent damage (including bending) to this connection region. Presuming the dimensions for micro splice protector 10 as given above with FIGS. 1 and 2, conventional optical fibers having an outer diameter on the order of 250 µm will easily fit within longitudinal bore 18 within micro splice protector 10.

Figure 4:
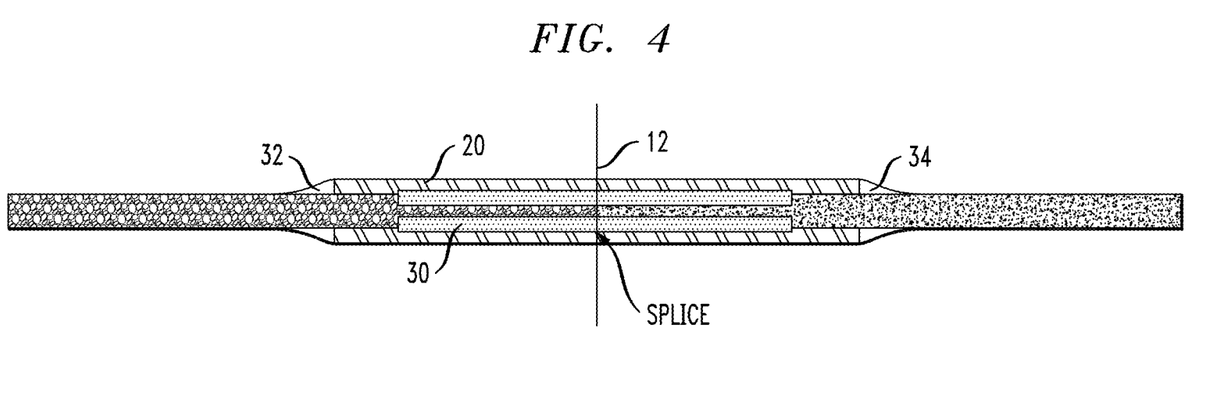
FIG. 4 is a cut-away side view of an alternative embodiment of the present invention, in this case including additional strain relief epoxy coatings at opposing ends of the sleeve component.

FIG. 4 is a cut-away side view of another embodiment of the present invention, where in this case additional strain relief members have been added to the micro splice protector, denoted in this illustration as micro splice protector 10'. In comparing the configuration of micro splice protector 10 of FIG. 1 to micro splice protector 10' of FIG. 4, the only difference is the addition of epoxy coatings 32 and 34 at the outer terminations 12-1 and 12-2 of sleeve 12. As shown, epoxy coatings 32, 34 are disposed to coat a portion of optical fibers 14, 16 (respectively) as well as outer terminations 12-1 and 12-2, creating a conformal coating that essentially eliminates any abrupt change in profile in the region of micro splice protector 10'.

Indeed, epoxy coatings 32, 34 function as strain relief components at the interface between micro splice protector 10' and non-stripped portions of optical fibers 14 and 16. The specific epoxy material used for strain relief components 32, 34 may be different from that used to affix fusion splice 12 to interior surface 21 of sleeve 20.

Figure 5:
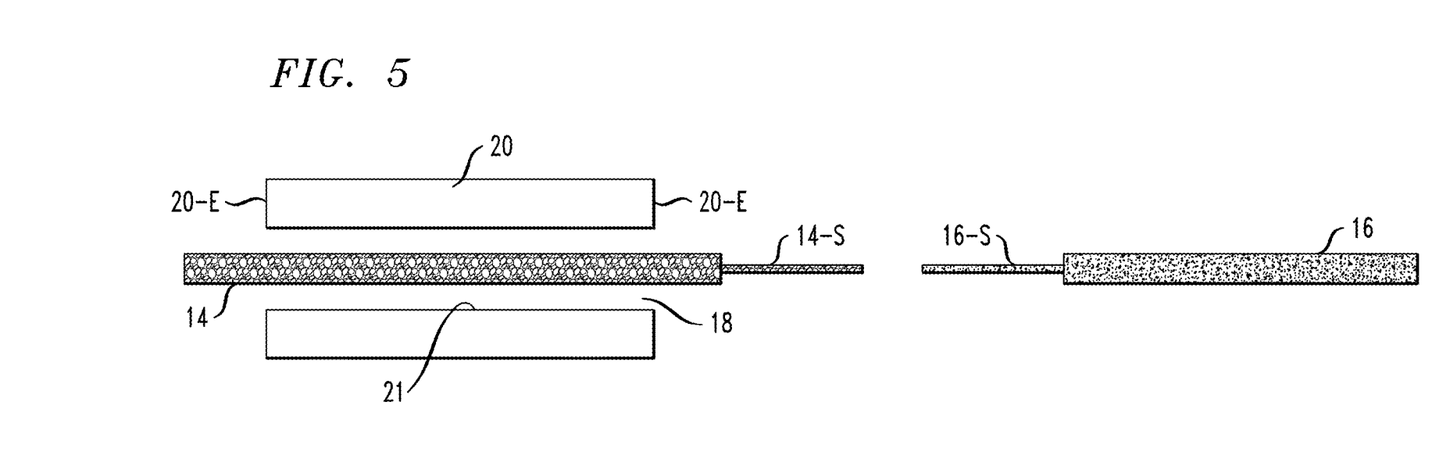
FIG. 5 illustrates an initial step in an exemplary method of including the inventive micro sleeve protector with a fusion splice.

FIGS. 5-10 illustrate an exemplary process for incorporating the use of inventive micro splice protector 10 with a fusion splice 12. To begin the process, cylindrical sleeve 20 is inserted over one of the optical fibers before initiating the fusion splice process itself. FIG. 5 is a cut-away side view, showing cylindrical sleeve 20 in place over an end region of optical fiber 14. It is to be noted that the end faces 20-E of micro splice protector 10 should be adequately prepared (i.e., smoothed and/or rounded) so that optical fiber 14 is not scratched or scored when being inserted within sleeve 20.

For the sake of illustration, the spacing between inner surface 21 of sleeve 20 and optical fiber 14 is exaggerated. Again, as discussed above in associated with FIG. 3, an inner diameter of sleeve 20 may be only about 50 μm larger than the outer diameters of optical fibers 14, 16 themselves.

At this initial point in the process as shown in FIG. 5, sleeve 20 is not affixed to optical fiber 14, but remains free to move back and forth along the longitudinal extent of the fiber. As also shown, optical fibers 14 and 16 have been prepared for the fusion splice process. In particular, an end termination 14-S of optical fiber 14 has been stripped to remove outer jacket and coating layers, leaving only the central core region and surrounding cladding layers. Optical fiber 16 has been similarly prepared to include a stripped end termination 16-S.

Figure 6:
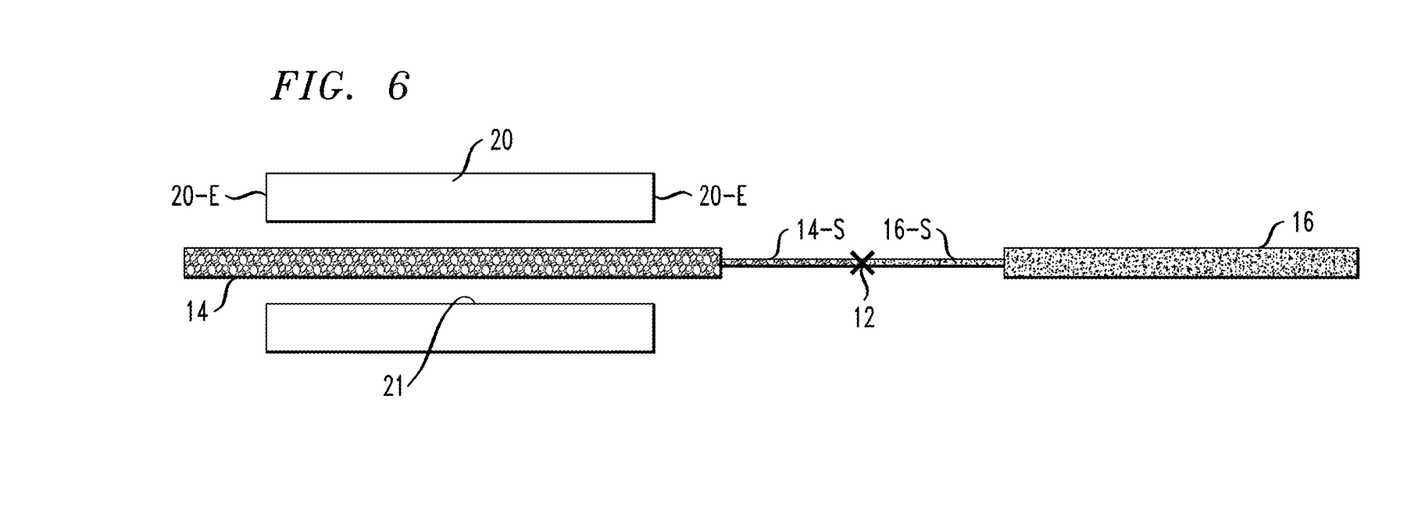
FIG. 6 illustrates a following step of forming a fusion splice between a pair of optical fibers.

After cylindrical sleeve 20 has been inserted over optical fiber 14 (and slid back to a location removed from the stripped end termination 14-S), a conventional fusion process is used to join end termination 14-S to end termination 16-S. The result of this conventional fusion process is shown in FIG. 6. Again, it is evident that cylindrical sleeve 20 is disposed at a distance from fusion splice location 12.

Figure 7:
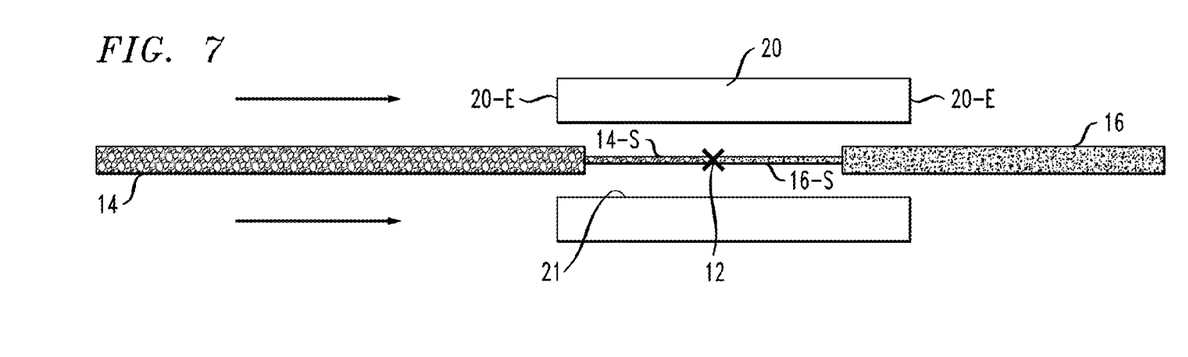
FIG. 7 illustrates the step of sliding the cylindrical sleeve portion of the micro splice protector over the fusion splice.

Once the fusion splice process is completed, cylindrical sleeve 20 is slid along optical fiber 14, as indicated by the arrows shown in FIG. 7, until it covers the area where the splice was formed. This is the configuration as shown in FIG. 7, where fusion splice 12 is essentially centered within the length L of cylindrical sleeve 20. It is preferred that interior surface 21 of cylindrical sleeve 20 is polished so that it does not scratch or otherwise damage the outer surface of fibers 14 and 16 as it is slid in place over fusion splice 12.

Figure 8:
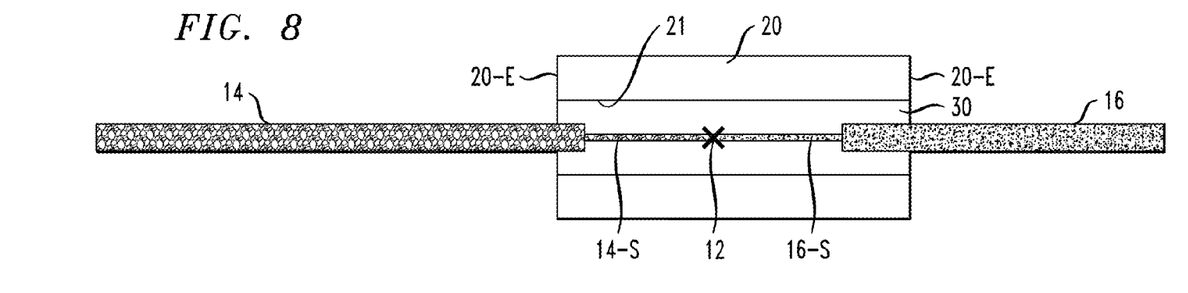
FIG. 8 illustrates the result of the step of injecting epoxy to fill the space between the interior of the cylindrical sleeve and the fusion splice.
Figure 9:
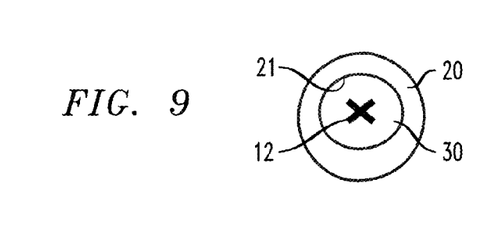
FIG. 9 is a cut-away end view of the configuration of FIG. 8.

Once cylindrical sleeve 20 is in place to surround fusion splice 12, a suitable epoxy or adhesive 30 is introduced into bore region 18, filling the space between the outer surface of fibers 14, 16 and inner surface 21 of cylindrical sleeve 20. FIG. 8 illustrates the configuration at this point in the process, where FIG. 9 is a cut-away view taken along line 9-9 of FIG. 8, illustrating the positioning of epoxy 30 to surround fusion splice 12 and thus provide mechanical attachment and strength to fusion splice 12, the combination of cured epoxy 30 with cylindrical sleeve 20 thus forming micro splice protector 10. Epoxy 30 may be thermally cured, and is chosen to achieve sufficient adhesion and flexibility so as to protect and preserve the optical performance of the fused fibers.

Figure 10:
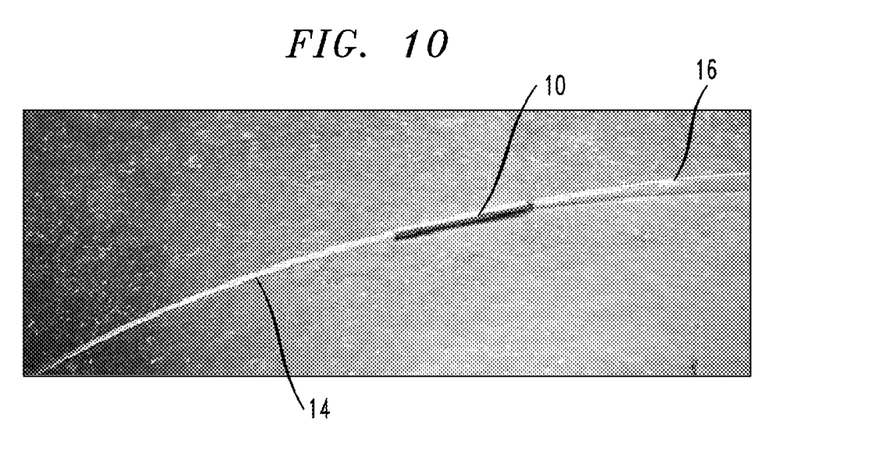
FIG. 10 is a photograph of an exemplary micro splice protector of the present invention, in place between a pair of optical fibers.
Figure 11:
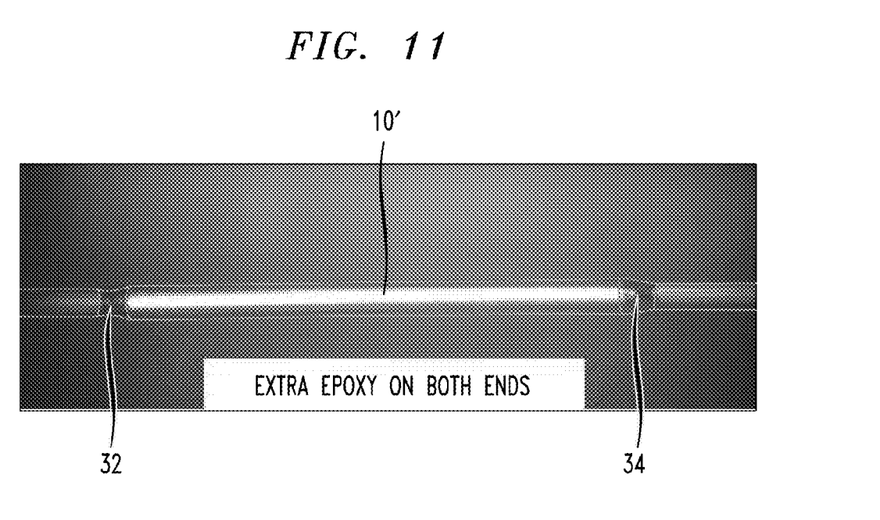
FIG. 11 is a photograph of an alternative embodiment of the present invention, including strain relief components used in conjunction with the cylindrical sleeve component.

FIG. 10 is a photograph of an exemplary micro splice protector 10 as in place over a fusion splice (not shown) coupling optical fiber 14 to optical fiber 16. It is evident that the low profile of cylindrical sleeve 20 allows for micro splice protector 10 to be only slightly larger in diameter than the fibers themselves. FIG. 11 is a photograph of an exemplary micro splice protector 10', including the additional strain relief epoxy coatings 32, 34 that smooth the transition from the outer surface of optical fibers 14, 16 and cylindrical sleeve 20.

Figure 12:
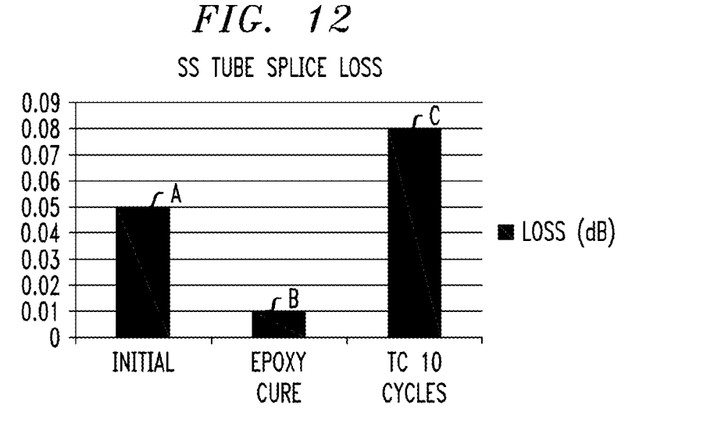
FIG. 12 is a graph depicting the change in insertion loss within a fusion splice associated with different conditions.

FIG. 12 is a bar chart of optical signal loss associated with a fusion splice formed in accordance with the present invention. Bar A in FIG. 12 is measure of optical signal loss associated with a configuration such as shown in FIG. 7, that is, with cylindrical sleeve 20 in place, but prior to injecting epoxy 30 to affix fusion splice 12 in place. As shown, without the presence of the epoxy, a coupling loss between fiber 14 and fiber 16 is on the order of about 0.05 dB. Once epoxy 30 is added and cured, forming the final configuration of micro splice protector 10 as shown in FIG. 1, the loss drops to a level of about 0.01 dB, shown as Bar B in FIG. 12. After a number of temperature cycling operations, the optical signal loss (represented by Bar C) remains under 0.10 dB (i.e., about 0.08 dB), within most system requirements.

Figure 13:
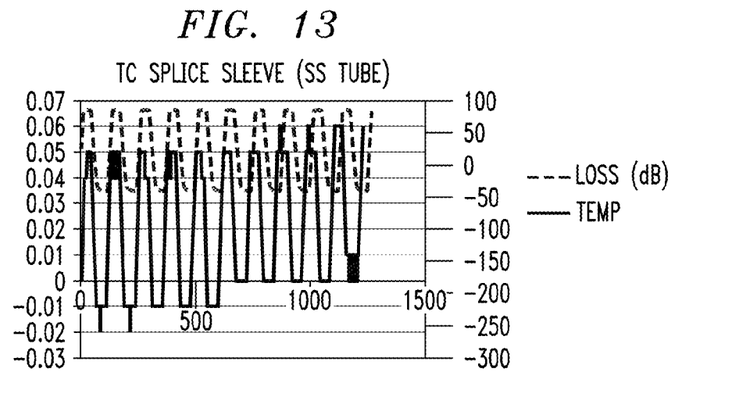
FIG. 13 is a graph comparing insertion loss to ambient temperature cycling for the micro splice protector of the present invention.
Figure 14:
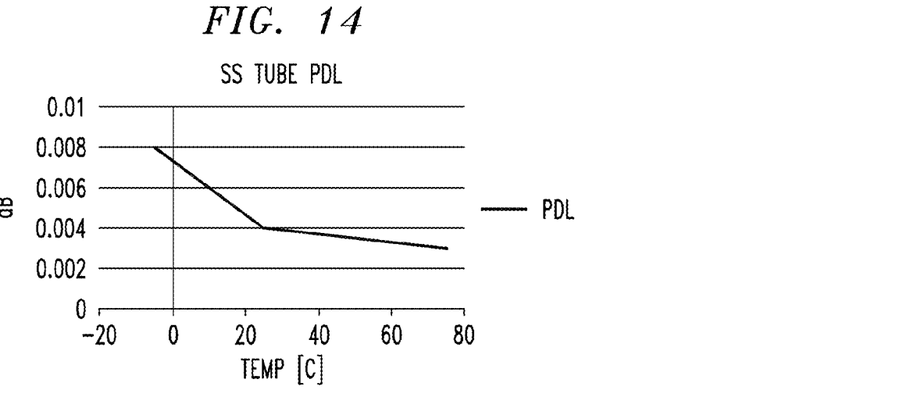
FIG. 14 is a graph of polarization dependent loss (PDL) as a function of temperature for the micro splice protector of the present invention.

FIG. 13 is a plot showing the variation in loss within the splice as the temperature is cycled between −25 and +75° C., and FIG. 14 is a graph showing the polarization dispersion loss within the splice as a function of ambient temperature. The data as shown in FIGS. 12-14 indicate that the inventive micro splice protector provides low insertion loss and polarization loss, even as the temperature is varied.

Figure 15:
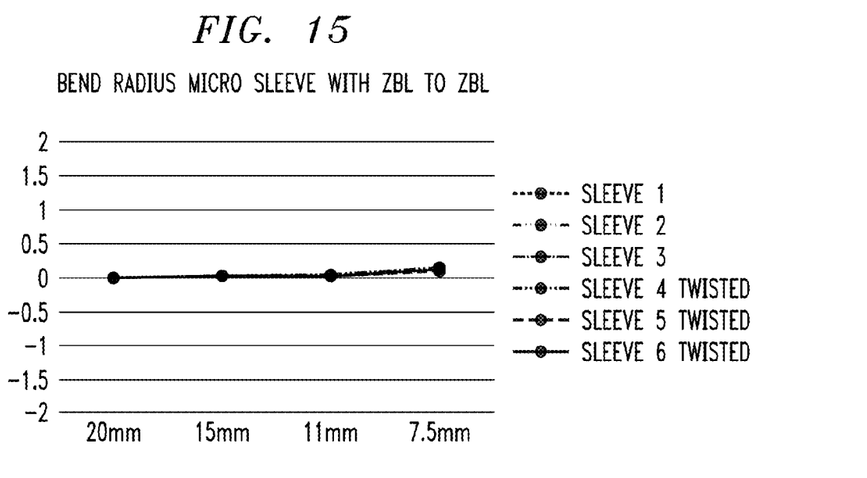
FIG. 15 is a graph depicting insertion loss as a function of bend radius for various embodiments of the present invention.

Additional measurements confirming the mechanical and optical properties of the inventive micro splice protector are shown in the plots of FIGS. 15-19. The plot of FIG. 15 shows the results of changing the bend radius of the micro splice protector when used with fiber that is fabricated to exhibit relatively low bend loss. As shown, there is little (if any) bend loss, even for the cases where the fiber is twisted. Thus, it is possible to bend a splice to a radius of 7.5 mm without incurring any signal penalty.

Figure 16:
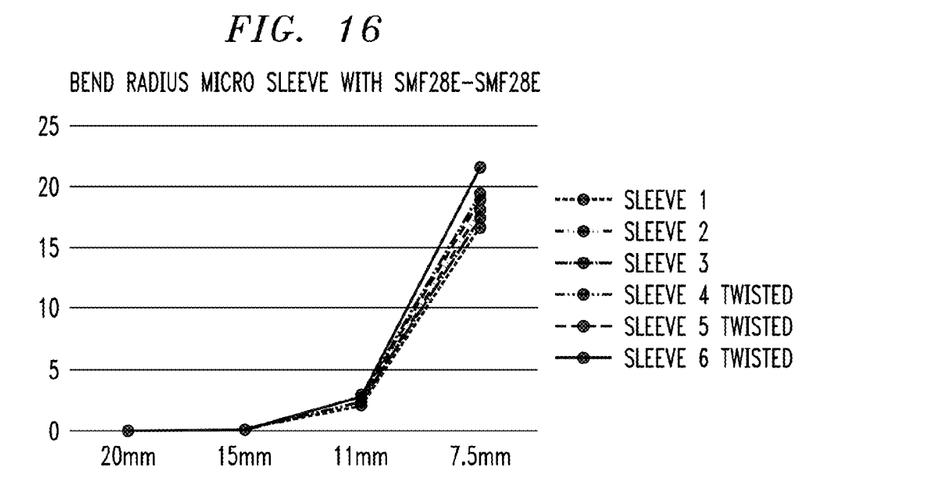
FIG. 16 is another graph depicting insertion for a different set of optical fibers.

FIG. 16 contains plots of the same set of experiments as associated with FIG. 15, in this case where the fusion splice is made between two standard single mode fibers. The results are consistent, regardless of the particular sleeve that is used and/or if the fibers are twisted. In this case, a bend radius to 11 mm appears to be acceptable.

Figure 17:
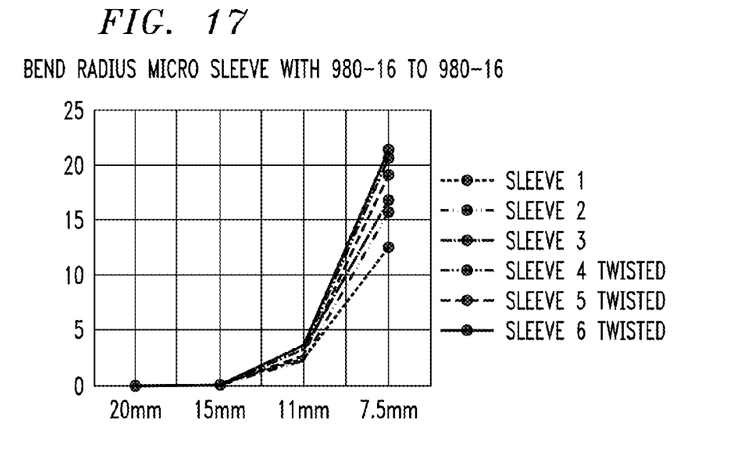
FIG. 17 is another graph depicting insertion loss as a function of bend radius, in this case for optical fibers utilized with an optical pump source for a fiber-based optical amplifier.
Figure 18:
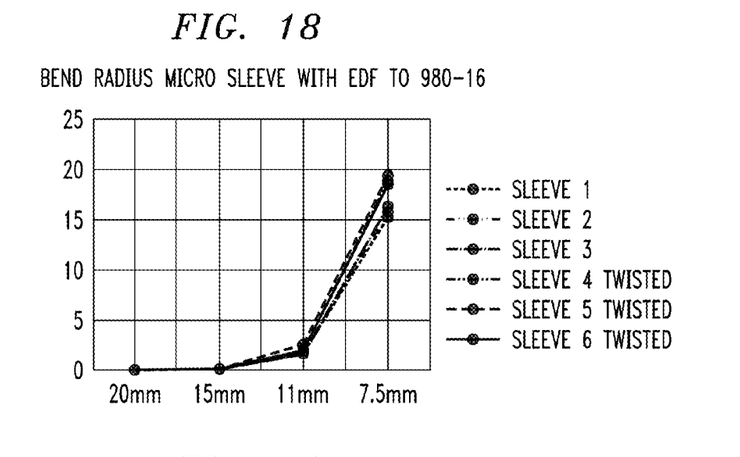
FIG. 18 is a graph of insertion loss as a function of bend radius for a micro splice protected fusion splice between dissimilar fibers.
Figure 19:
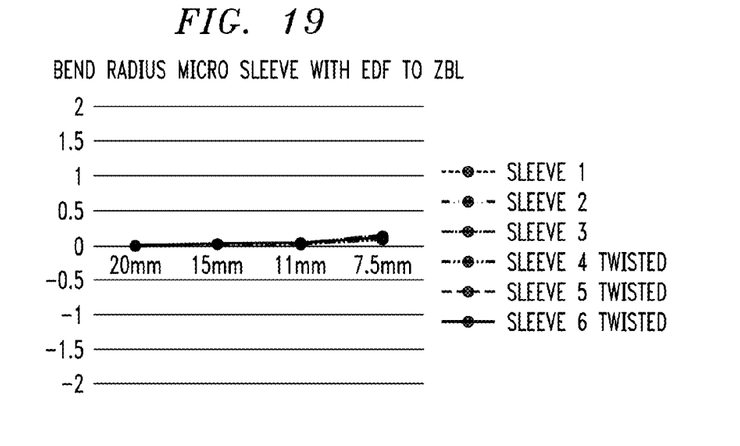
FIG. 19 is a graph of insertion loss as a function of bend radius for a micro splice protected fusion splice between EDF and ZBL fibers.

FIG. 17 shows plots of the same experiments, in this case associated with creating and protecting a fusion splice between a pair of fibers typically used to support the propagation of pump light in optical amplifiers. These results are similar to those shown in FIG. 16. The plots shown in FIG. 18 are associated with a fusion splice created between a section of erbium-doped gain fiber and a pump fiber (again, similar to the SMF results) and FIG. 19 shows plots associated with a splice created between an erbium-doped gain fiber and a low-bend-loss fiber. The inclusion of the low-bend-loss fiber in the latter experiments yields results closer in performance to those shown in FIG. 15.

While the above discussion is associated with the use of a stainless steel micro splice protector, it is to be understood that various other materials that exhibit the desired rigidity and other properties may be used. As mentioned above, various other metals, ceramics, MMCs, and the like are also possible candidates for use as a micro splice protector. The actual length and inner/outer diameters of the micro splice protector may also be modified, as need be, to best match the properties of the fused fibers.

What is claimed is:
1. A method of making a protected fusion splice between a pair of optical fibers, the method including the steps of:
   disposing a cylindrical sleeve of rigid material over an end termination of a first optical fiber, the cylindrical sleeve having an inner diameter only slightly greater that the outer diameter of the first optical fiber;

preparing an end portion of the first optical fiber for fusion splicing by stripping away outer coating and jacket layers;

preparing an end portion of a second optical fiber for fusion splicing by stripping away outer coating and jacket layers;

fusing together stripped end faces of the first and second optical fibers to create a fusion splice therebetween;

sliding the cylindrical sleeve along the first optical fiber so as to position the cylindrical sleeve over the fusion splice;

injecting epoxy to flow within an interior region of cylindrical sleeve so as to fill areas between the fusion splice, stripped end terminations and an interior surface of the cylindrical sleeve; and curing the epoxy to create the protected fusion splice.

2. The method as defined in claim 1 wherein the method further includes the steps of:

depositing a first epoxy coating at a first end termination of the cylindrical sleeve in a manner so as to coat a portion of the first optical fiber;

depositing a second epoxy coating at a second end termination of the cylindrical sleeve in a manner so as to coat a portion of the second optical fiber; and curing the first and second epoxy coatings to create strain relief components for the protected fusion splice.

3. The method as defined in claim 1 wherein prior to inserting the cylindrical sleeve over the first optical fiber, both end terminations and the inner surface of the cylindrical sleeve are polished.

4. The method as defined in claim 1 wherein the cylindrical sleeve comprises a rigid material selected from the group consisting of: metals, ceramics and metal matrix composites.

5. The method as defined in claim 1 wherein the cylindrical sleeve comprises stainless steel.

\* \* \* \* \*